June 14, 1960     F. B. ROBB     2,940,675

AERATOR

Filed Dec. 1, 1955

INVENTOR.
F. B. ROBB
BY
Robb & Robb
attorneys

United States Patent Office 2,940,675
Patented June 14, 1960

2,940,675
AERATOR
Frank B. Robb, 1351 Mayfield Ridge Road,
Mayfield Heights, Ohio
Filed Dec. 1, 1955, Ser. No. 550,338
1 Claim. (Cl. 239—431)

This invention relates to aerators, and particularly such devices as are suitable for use in conjunction with faucets for the control of water in kitchens, bathrooms, and other like applications.

Whereas heretofore many such devices have been designed and used, the complexity of most or some other annoying feature has limited their application for reasons of cost or of difficulty of manufacture as well as objection arising after use for a period of time, the instant invention is composed of simple parts, cheap to manufacture, not requiring any tricky assembly and substantially free from prior difficulties as to make it susceptible of nearly universal application.

One of the chief differentiating features in the instant invention is the provision of a simple housing arranged to direct liquid therethrough, initially dividing the same into fine streams, causing the streams to flow over a sphere of chemically inert material and ingest air during flow to the outlet of the housing, and causing the air to combine with the water to form aerated droplets of water which are emitted from the said outlet.

It is therefore a principal object of the invention to provide a simple, inexpensive aerator which is comprised of few parts readily assembled by unskilled persons, the parts being arranged so as to of necessity assume their proper positions.

A further object of the invention is to provide an aerator which may avail of relatively inexpensive materials, which may include plastic of various types, commonly used at the present time for related purposes.

Yet another object of the invention is to provide an aerator which includes as an essential part thereof a member which is preferably spherical, which member is desirably freely moveable and yet positioned to assist in the aeration action.

A still further object of the invention is to arrange the parts of the aerator so that the spherical member referred to may be most effectively positioned to assist in the aeration process, and said member may be rotatable about its center, liquid flow under some conditions causing such motion, said motion in turn preventing the accumulation of foreign matter or materials thereon.

Other and further objects of the invention will be understood from a consideration of the appended specification and disclosed in the drawing wherein.

Figure 1:
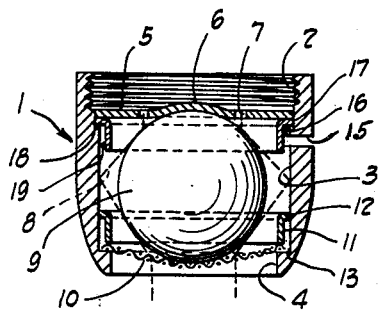
Figure 1 is a vertical sectional view through an aerator constructed in accordance with the invention hereof.

Referring now to the drawing, Figure 1 shows a sectional view of the entire device and indicates a generally cylindrical housing denoted 1 as being provided at its upper portion with a threaded opening 2 which opening is adapted to receive a column of water since the housing may be supported on a spout from which such column of water may issue, the housing having a cylindrical interior indicated at 3.

Figures 3, 4:
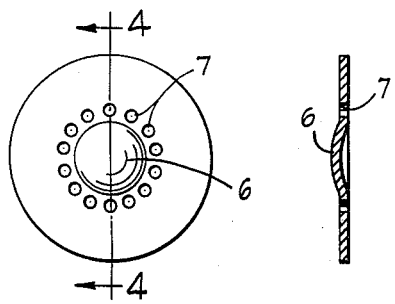
Figure 3 is a view disclosing the means for dividing a column of liquid into fine streams.
Figure 4 is a sectional view taken about on the line 4—4 of Figure 3 looking in the direction of the arrows.
Figures 5, 6:
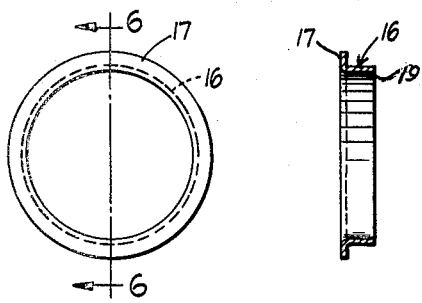
Figure 5 is a plan view showing one of the parts of the aerator denoted as shroud.
Figure 6 is a sectional view of the shroud shown in Figure 5 taken about on the line 6—6 looking in the direction of the arrows.
Figure 9:
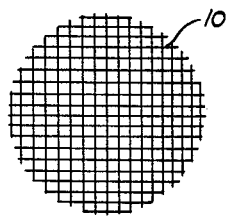
Figure 9 is a plan view of a screen or other foraminous part which is availed of a supporting element of the spherical member.

At the end opposite the threaded portion 2, is the outlet section 4 between which inlet 2 and outlet 4 means indicated at 5 and comprising a substantially flat washer-like member having a spherically formed portion 6 at its center, is mounted. The said member 5 is provided as indicated in Figure 3 with a series of small openings or perforations therein denoted 7 through which the water column must pass. The column is thus divided into a series of fine streams, indicated by the dotted lines 8 as to their paths, or at least the paths of certain portions of said streams. The streams impinge upon a sphere or ball member 9 mounted within the housing 1 and maintained substantially centrally in the cylindrical interior 3 by means of the spherically shaped portion 6 of the member 5 and a supporting element, in this case being indicated at 10 and comprising a screen or other foraminous part shown in plan in Figure 9 and mounted as illustrated in Figure 1 beneath the said sphere 9.

Figure 7:
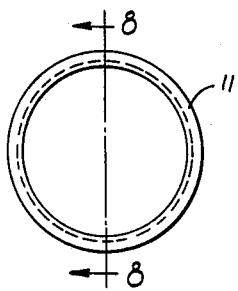
Figure 7 is a plan view showing the retainer and supporting element positioning device of the aerator.
Figure 8:
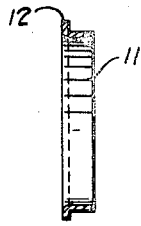
Figure 8 is a sectional view taken about on the line 8—8 of Figure 7.

In order to maintain the foraminous part or screen 10 in place, a suitable retainer 11 is provided, being shown in plan in Figure 7, which is of such diameter as to its flange 12 as to frictionally engage the interior cylindrical surface 3 of the housing. The screen 10 is thus held in place against a shoulder 13 formed in the housing.

Figure 2:
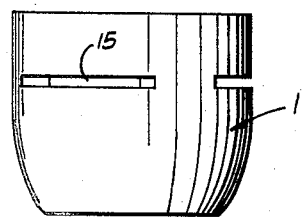
Figure 2 is is a side elevation showing the air inlet openings in the aerator housing.

Slightly below the member 5, and illustrated as to their exterior arrangement in Figure 2, are the air openings or slots 15 which slots 15 may be milled or otherwise formed so as to admit air into the interior of the housing 1. A suitable shroud 16 is provided, which shroud 16 includes an outwardly extending lip 17 for engagement with a shoulder 18 formed in the interior of the housing 1. A skirt of the shroud 16 denoted at 19 extends downwardly to and somewhat below the lowermost portion of the openings 15.

The purpose of the skirt 19 is to prevent the escape of water as it passes through the housing 1 and at the same time permit the ingestion of air caused by the flow of liquid which air thus becomes mixed with the liquid and provides a bubble-like mixture which is emitted from the outlet 4.

The sphere or ball 9 is positioned so that it is freely moveable between the member 10 and the portion 6 of part 5 whereby under certain conditions, the flow of water through the openings 7 will cause slight rotative movement of the ball to prevent the accumulation of foreign material or matter on the surface of the ball 9.

It has been found that by providing a ball 9 of nylon or similar inert material and arranging the openings 7 so as to cause the column of liquid to be broken into fine streams as it passes through the openings a particularly effective device is provided. The streams in some cases following the paths indicated 8 in the dotted lines are caused to flow along a portion of the surface of the sphere 9, move downwardly along the same in a film for a distance, leave the surface and impinge against the interior 3 of the housing 1, subsequently being caused to move back toward the spherical body 9 and portions thereof moving there along, the impingement of the liquid with the interior of housing 1 causing the same to be broken up and the ingested air mixed therewith so that when the water is emitted from the outlet, water-coated droplets of air are provided.

Figure 10:
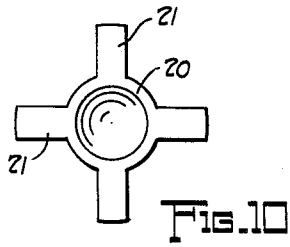
Figure 10 is a plan view of a modified form of supporting element.
Figure 11:
Figure 11 is a side view of the supporting element shown in Figure 10.

While the screen or foraminous member 10 is often availed of to assist in breaking up the droplets into still finer parts, it may be replaced by a supporting means such as indicated in Figure 10 comprising a centrally formed part 20 having a spherical section indicated in Figure 11, similar to the portion 6 of the part 5 there being a series of arms 21 extending from the portion 20 and adapted to be supported on the shoulder 13 previously described. In this instance there will be no need to provide the retainer 11 since the part shown in Figure 10 may be of sufficient strength of itself so that in conjunction with the pressure of the sphere 9 thereon it would be maintained in position.

It will be understood that the ball or sphere 9 need not be solid, but may be a hollow member and thus very light in construction or it may be made of metal in place of the plastic suggested in accordance with desired practice in manufacturing.

It will be apparent further that the assembly of the aerator herein above described is extremely simple involving only the positioning of the part shown in Figure 10, thereafter introducing the sphere 9 into the interior of the housing 1. Subsequently the shroud 16 will be dropped onto the shoulder 18 and thereafter the part 5 placed in position, which by reason of the spherical portion 6 will cause the sphere 9 to assume a substantially central location, it being noted that it thereby occupies a large portion of the interior of the housing 1.

I claim:

In an aerator of the class described, in combination, a housing having a liquid inlet at one end and an outlet at the other, said inlet being arranged to receive a column of liquid, means adjacent said inlet to divide the column into a series of fine streams generally parallel to the axis of said column, freely universally rotatably moveable means comprising a spherical member intermediate the inlet and outlet aforesaid, said means being formed to cause at least certain of the fine streams to initially assume a film-like condition during a portion of the distance travelled toward the outlet, said means thereafter causing such liquid to impinge against the inner side of the housing and prior to emission from the outlet again contact the moveable means, air inlet openings in said housing through which air is ingested during liquid travel through the housing, and a supporting element at the outlet end to position the moveable means aforesaid, the means to divide the column into streams comprising a plate having a section to position the spherical member, and the supporting element at the outlet supporting the member and in conjunction with said plate positions the spherical member substantially centrally within the housing.

References Cited in the file of this patent

UNITED STATES PATENTS

| | | |
|---|---|---|
| 2,707,624 | Shames et al. | May 3, 1955 |
| 2,738,963 | Goodrie | Mar. 20, 1956 |
| 2,740,665 | Dorsak et al. | Apr. 3, 1956 |
| 2,785,881 | Dolan | Mar. 19, 1957 |
| 2,842,347 | Ripley | July 8, 1958 |